(12) United States Patent
Ware et al.

(10) Patent No.: US 8,255,734 B2
(45) Date of Patent: Aug. 28, 2012

(54) MULTI-DROP SIGNALING SYSTEM AND METHOD EMPLOYING SOURCE TERMINATION

(75) Inventors: Frederick Ware, Los Altos Hills, CA (US); Bret G. Stott, Menlo Park, CA (US)

(73) Assignee: Rambus Inc., Sunnyvale, CA (US)

( * ) Notice: Subject to any disclaimer, the term of this patent is extended or adjusted under 35 U.S.C. 154(b) by 86 days.

(21) Appl. No.: 12/866,088

(22) PCT Filed: Jan. 26, 2009

(86) PCT No.: PCT/US2009/031985
§ 371 (c)(1),
(2), (4) Date: Aug. 4, 2010

(87) PCT Pub. No.: WO2009/099788
PCT Pub. Date: Aug. 13, 2009

(65) Prior Publication Data
US 2011/0010575 A1      Jan. 13, 2011

Related U.S. Application Data

(60) Provisional application No. 61/026,248, filed on Feb. 5, 2008.

(51) Int. Cl.
*G06F 1/00* (2006.01)

(52) U.S. Cl. ........................................ 713/500; 711/167

(58) Field of Classification Search .................. 713/500, 713/502–503; 711/167; 710/45
See application file for complete search history.

(56) References Cited

U.S. PATENT DOCUMENTS 6,430,606 B1     8/2002   Haq
6,510,100 B2     1/2003   Grundon et al.
2003/0200407 A1  10/2003  Osaka et al.

FOREIGN PATENT DOCUMENTS

EP    0913776 A2    5/1999
WO    93/18463 A1   9/1993

OTHER PUBLICATIONS

"Notification of Transmittal of the International Search Report and the Written Opinion of the International Searching Authority mailed on Aug. 12, 2009 for PCT/US2009/031985 filed on Jan. 26, 2009." 17 pages.
EP Office Communication Pursuant to Rules 161(1) and 162 EPC, dated Sep. 16, 2010 in EP Application No. 09708555.9. 2 pages.
EP Office Action dated Dec. 8, 2011 re EP Application No. 09708555.9. 6 Pages.
PCT Preliminary Report (Chapter II) dated Oct. 14, 2011 re Int'l Application No. PCT/US2009/031985 filed Jan. 26, 2009. 8 Pages.
EP Response dated Jun. 18, 2012 to the Official Communication dated Dec. 8, 2011 in EP Application No. 09708555.9, Includes New Claims 1-15 (Clear and Highlighted copies) and New Description of pp. 1, 1a and 27. 17 pages.

*Primary Examiner* — Clifford Knoll

(57) ABSTRACT

A signaling system employs parallel termination for a timing reference signal and series termination for information signals that may be sampled using the timing reference signal. In this way, the system may provide desired levels of signal performance and power consumption. In addition, the system may be configured such that the initial wavefronts of these signals may travel in opposite directions along complementary signaling paths. For example, a timing reference signal that travels from a driving device (e.g., a memory controller) to several destination devices (e.g., memory devices) in a multi-drop/fly-by fashion may arrive at the destination devices in a given order. In contrast, associated information signals may travel from the driving device to the destination devices such that they arrive at the destination devices in the opposite order.

20 Claims, 8 Drawing Sheets

MULTI-DROP SIGNALING SYSTEM AND METHOD EMPLOYING SOURCE TERMINATION

CROSS-REFERENCE TO RELATED APPLICATION(S)

This application claims the benefit of U.S. Provisional Application No. 61/026,248, filed Feb. 5, 2008, the disclosure of which is incorporated by reference herein.

TECHNICAL FIELD

This application relates generally, but not exclusively, to signal routing topologies and to computer memory technology.

BACKGROUND

A memory system may employ a memory controller through which a component (e.g., system processor) of an associated system gains access to several memory devices. For example, a memory controller may be adapted to control the operation of and provide access to the memory devices by communicating with the memory devices over a signaling path (e.g., signal traces of a printed circuit board). In some implementations such a signaling path is directly coupled to several discrete memory devices (e.g., DRAM integrated circuits). In other implementations a signaling path may be coupled to one or more memory modules, each of which may include one or more memory devices.

A signaling path may be routed in a multi-drop/fly-by fashion between the memory controller and the memory devices. For example, a signaling path comprising printed circuit board traces may be routed from the memory controller to a first one of the memory devices and then to a second one of the memory devices and so on. In practice, such a configuration may negatively impact the rate at which high speed signals may be sent over the signaling path and/or the power consumption of the memory system. For example, when operating at relatively high signaling rates, any discontinuity in the signaling path (e.g., a discontinuity at the end of the signaling path) may cause signal reflections that interfere with the transmission of another signal (e.g., a subsequently transmitted bit) along the signaling path. Consequently, parallel termination resistors may be employed at the end of the signaling path in an attempt to eliminate the discontinuity at that point and thereby reduce any associated signal reflections. The use of such parallel termination resistors may, however, increase the power consumption of the memory system due to the resulting current flow through these resistors.

BRIEF DESCRIPTION OF THE DRAWINGS

Various aspects of the disclosure are described in the detailed description and appended claims that follow, and in the accompanying drawings, wherein:

Figure 1:
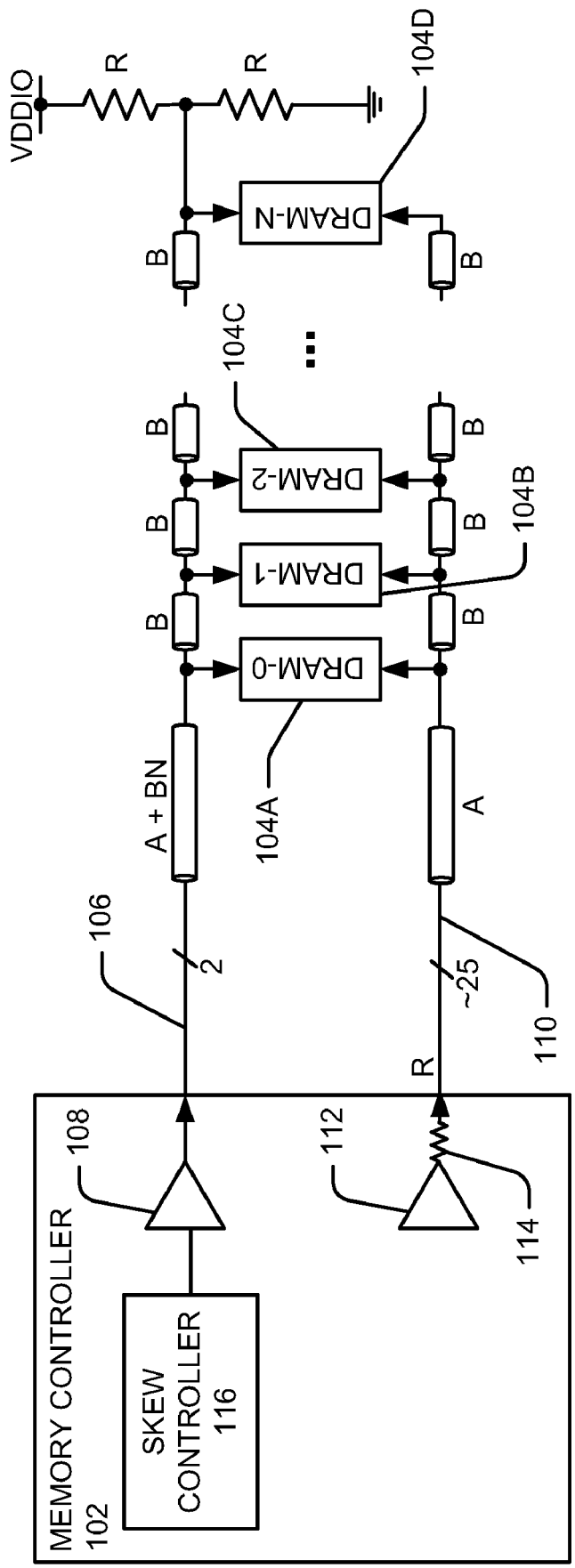
FIG. 1 is a simplified diagram of an embodiment of a memory system employing parallel termination for a timing reference signal and series termination for information signals.

In accordance with common practice the various features illustrated in the drawings may not be drawn to scale. Rather, the dimensions of the various features may be arbitrarily expanded or reduced for clarity. In addition, some of the drawings may be simplified for clarity. Thus, the drawings may not depict all of the components of a given apparatus or method. Finally, like reference numerals may be used to denote like features throughout the specification and figures.

DETAILED DESCRIPTION

The description that follows sets forth one or more illustrative embodiments. It should be appreciated that the teachings herein may be embodied in a wide variety of forms, some of which may appear to be quite different from those of the disclosed embodiments. Consequently, the specific structural and functional details disclosed herein are merely representative and do not limit the scope of the disclosure. For example, based on the teachings herein one skilled in the art should appreciate that the various structural and functional details disclosed herein may be incorporated in an embodiment independently of any other structural or functional details. Thus, an apparatus may be implemented or a method practiced using any number of the structural or functional details set forth in any disclosed embodiment(s). Also, an apparatus may be implemented or a method practiced using other structural or functional details in addition to or other than the structural or functional details set forth in any disclosed embodiment(s).

The disclosure relates in some aspects to a signaling scheme that employs parallel termination for a timing reference signal and series termination for associated information signals. Such a scheme may be advantageously employed in a system where a component sends signals to other components via a multi-drop signal path (e.g., a signal bus). Here, information signals may be series terminated rather than parallel terminated to reduce the power consumption associated with the termination. In contrast, parallel termination may be employed for a timing reference signal that is used, for example, to sample the information signals. In this way, the system may maintain the signal integrity of the timing reference signal (e.g., by maintaining relatively high quality timing edges).

As will be discussed in more detail below, the use of series termination in a multi-drop topology may affect the sampling times of any signals carried by the multi-drop path. For example, in some cases a signal is not sampled at a device until after the reflected wavefront of the signal reaches the device. Due to the delay that is associated with waiting for the reflected wavefront, such a scheme may adversely impact the timing margins of a system.

The disclosure relates in some aspects to techniques for providing improved timing margin in a system employing parallel and series termination on associated signal paths. For example, in some aspects timing margins may be improved by configuring a system such that the initial wavefront of timing reference signal travels in the same direction as reflected wavefronts of associated information signals.

To this end, the disclosure relates in some aspects to a signaling path topology where initial wavefronts of associated signals travel in opposite directions along complementary signal paths. For example, a driver component for a parallel terminated signal path may generate a signal that initially travels to a first component, subsequently travels to a second component, and then travels to a third component. Conversely, a driver component for a series terminated signal path may generate a signal that initially travels to the third component, subsequently travels to the second component, and then travels to the first component. Here, given the opposite directions of travel for the initial wavefronts, the reflected wavefront of the series terminated signal will travel in the same direction as the initial wavefront of the parallel terminated signal.

These and other aspects of the disclosure will be discussed in more detail in the context of a controller-based memory system including a memory controller and associated memory components. It should be appreciated that the discussion that follows is provided for illustration purposes and that the disclosed concepts may be applicable to other types of systems, including those that do not employ a memory controller and/or memory components.

In FIG. 1, a memory system 100 includes a memory controller 102 and several DRAM memory devices 104A-104D. For convenience, the discussion that follows may refer to one of these memory devices as the memory device 104 or may collectively refer to these memory devices as the memory devices 104.

The memory controller 102 is coupled (e.g., connected) to the memory devices 104 via several signaling paths. For example, a first signaling path 106 comprising a pair of traces that run from a signal driver 108 of the memory controller 102 to each of the memory device 104 using a "fly-by" multi-drop topology. As will be discussed in more detail below, parallel termination is provided at the end of the signaling path 106 (e.g., using one or more resistors R or other suitable components).

A second signaling path 110 comprising several (e.g., 25) traces runs from a signal driver 112 of the memory controller 102 to each of the memory devices 104 using a "fly-by" multi-drop topology. To reduce the complexity of FIG. 1, only a single signal driver 112 is shown. It should be appreciated, however, that a separate signal driver component may be used to drive each individual signal path (or each differential signal path) of the signaling path 110. For convenience, a given signal path of the signaling path 110 (or a pair of signal paths for a differential signal) may be referred to herein as the signal path 110. In a similar manner, a given driver component that drives a single signal path 110 may be referred to herein as the signal driver 112.

The signaling path 110 is not parallel terminated, but is instead series terminated at the signal source. For example, a series impedance 114 may follow and/or may be incorporated into each component of signal driver 112. As illustrated by the example of FIG. 1, this source termination is thus provided on the signaling path 110 somewhere to the left of the memory devices 104. As mentioned above, series termination may be employed on the signaling path 110 to reduce the power consumption of the system 100.

A simplified example of power savings that may be achieve through the use of series termination will be described briefly. Here, a comparison will be made between a system such as the system 100 that employs only parallel termination and a system that employs the series termination scheme depicted in FIG. 1.

For the parallel termination only system, we assume that parallel termination as depicted in FIG. 1 is employed on the signaling path 110. In this case, each signal path of the signaling paths 106 and 110 may have one resistor (e.g., 150 ohms) coupled between the signal path and VDDIO (e.g., 1.8V) and another resistor (e.g., 150 ohms) coupled between the signal path and ground. In addition, a low impedance driver (e.g., having 18 ohm output impedance) may be used to drive each signal path. That is, in a parallel termination only system, the signal driver 108 and the signal driver 112 may comprise low impedance drivers.

In this case, the active static (DC) power of the system may be $\Delta V^2/\text{Reff}*\text{number of signal lines}$, or $(1.8)^2/166*27=527$ mW. In addition, the standby (HiZ) static (DC) power of the system may be $\Delta V^2/\text{Reff}*\text{number of signal lines}$, or $(1.8)^2/300*27=292$ mW. Here, the active static power may be 20%-25% of the peak memory system power and 40%-50% of the average memory system power. In addition, the standby power may be 10%-15% of the peak memory system power and 15%-25% of the average memory system power. Moreover, in such a case, the memory controller may be configured to aggressively manage the standby power state.

For the series termination-based system of FIG. 1, it is assumed that the signaling path 106 remains as above. Thus, the signal driver 108 may have an 18 ohm output impedance and the two signal paths of the signaling path 106 are each coupled to a pair of 150 ohm resistors, one of which is coupled to a VDDIO of 1.8V and the other of which is coupled to ground. For the signaling path 110, there is no parallel termination and the signal driver 112 (i.e., the driver component for each signal path) has an output impedance of 50 ohms to match the nominal impedance of each signal path of the signaling path 110.

In this case, the active static (DC) power of the system may be $\Delta V^2/\text{Reff}*\text{number of signal lines}$, or $(1.8)^2/166*2=39$ mW. In addition, the standby (HiZ) static (DC) power of the system may be $\Delta V^2/\text{Reff}*\text{number of signal lines}$, or $(1.8)^2/300*2=22$ mW.

From the above, it may be seen that significant advantages may be achieved through the use of series termination. As discussed above, substantial power savings may be achieved in such a system. For example, a static power savings on the order of 10 to 15 times and an overall power savings on the order of 20% to 30% may be achieved. In addition, the power integrity of the system may be improved due to reduced dI/dt and through the use of higher source impedances. Accordingly, the embodiment of FIG. 1 may be advantageously employed in relatively low power systems (e.g., mobile applications such as notebook computers, ultra-mobile personal computers, and handheld devices). In addition, a system constructed in accordance with the topology of FIG. 1 may employ fewer components due to for example, the elimination of parallel termination components such as resistors or FET switches.

As mentioned above, the use of series termination may impact timing margins in the system 100. Various techniques that may be employed in conjunction with attempting to optimize system timing will now be described with reference to FIG. 1 and the timing diagrams of FIG. 2.

The symbols designated A, B, and A+BN along the signaling paths 106 and 110 in FIG. 1 represent sample propagation delay times along segments of the paths. For example, the symbol A of the path 110 represents the time it takes a signal to propagate from the controller 102 to the DRAM 104A.

Each symbol B represents the time it takes a signal to propagate from one DRAM (e.g., DRAM 104A) to the next DRAM (e.g., DRAM 104B). The symbol designated A+BN represents a propagation delay time that may be selected to optimize timing margin in the system 100 as discussed in more detail below. It should be appreciated that the delays described herein may be taken into account when defining the minimum clock period time for a system.

In accordance with the teachings herein, the signaling path 106 may carry a timing reference signal and the signaling path 110 may carry information signals. For example, in some embodiments the timing reference signal comprises a clock signal (e.g., a differential clock having components CK and CKN), a strobe signal, or some other suitable signal that may be used to sample another signal. In addition, in some embodiments the information signals comprise data signals, command and address ("C/A") signals such as read and/or write request ("RQ") signals, command signals (e.g., op codes), address signals, or control signals, or some other type of signal that may be sampled based on a sampling reference signal (e.g., the timing reference signal).

In some implementations the signaling paths 106 and 110 may be employed in a synchronous (e.g., source synchronous) system where a known phase relationship may be provided between the timing reference signals and the information signals so that the timing reference signals may be used, for example, to directly sample the information signals. In this case, the signaling paths 106 and 110 may be "bundled" together whereby the paths follow similar (e.g., parallel) routes in an attempt to maintain a desired timing relationship between the timing reference signal and the associated information signals along the signaling paths. Accordingly, the topologies described herein may be employed in dual data rate ("DDR") type memory systems or other systems where synchronous signals may be advantageously employed.

Figure 2:
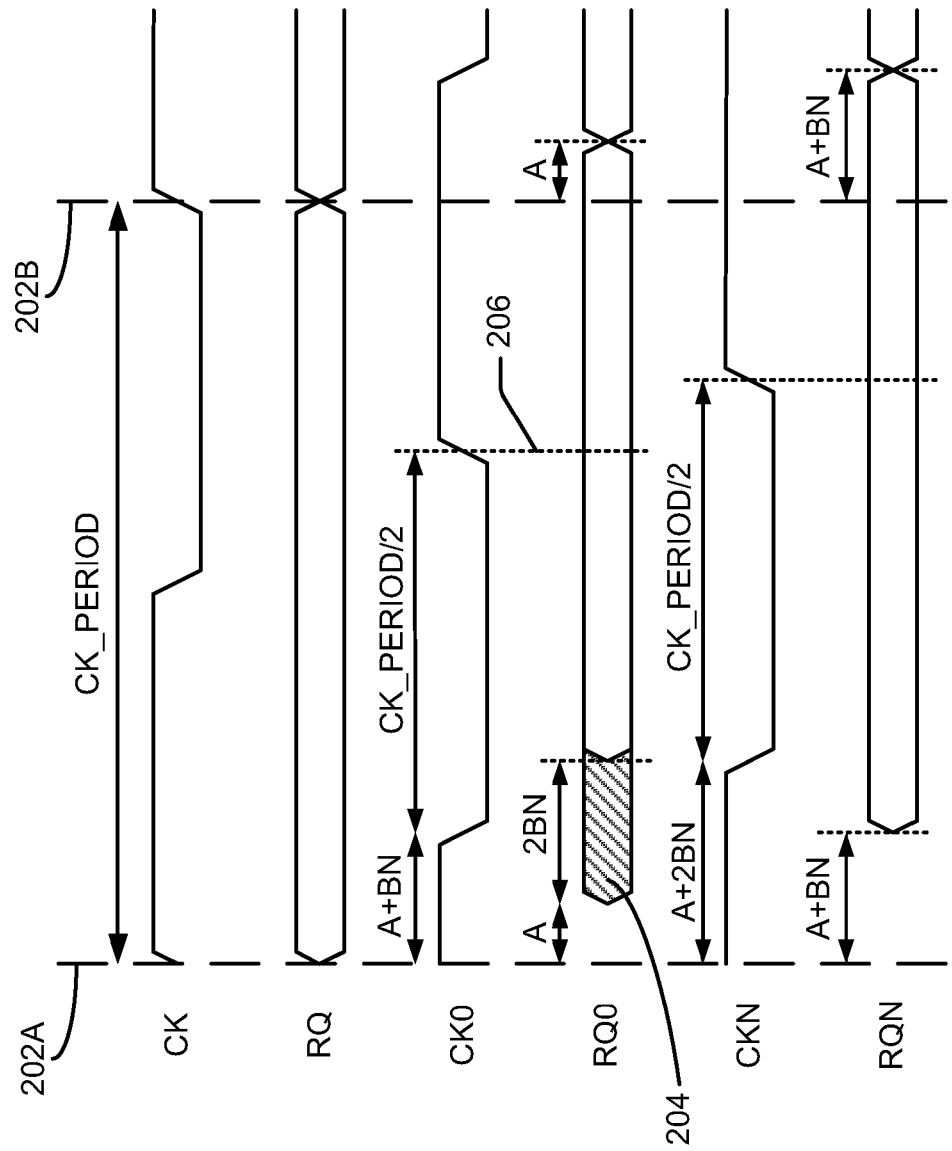
FIG. 2 is a simplified diagram of sample signal timing that may be employed in the memory system of FIG. 1.

Referring now to FIG. 2, a clock signal CK (e.g., provided on path 106) and a request signal RQ (e.g., provided on path 110) are depicted as they may be provided by the memory controller 102. Specifically, RQ may be generated based on CK whereby transitions of RQ may coincide with the rising edge of CK. Here, the time duration of the period of CK (CK_PERIOD) is represented by a pair of vertical dashed lines 202A and 202B.

The signal CK may be used at each of the devices 104 to sample (e.g., "clock in") each RQ signal. Due to the series termination at the source of the path 110, however, the amplitude of the initial wavefront of RQ may be less than VDDIO (e.g., ½ VDDIO) due to the voltage divider formed by the source resistance and the impedance of the path 110 (e.g., when both are 50 ohms). Hence, the initial wavefront of RQ may not provide a sufficient signal level for sampling by CK.

Nevertheless, the absence of a parallel termination at the end of the path 110 results in a discontinuity that causes the initial wavefront of RQ to be reflected back toward the controller 102. Moreover, the magnitude of this reflection may be approximately equal to the magnitude of the initial wavefront (e.g., VDDIO/2). Consequently, the amplitude of the RQ signal will reach its full value (e.g., approximately VDDIO) at a given device 104 when the wavefront of the reflection reaches that device.

Under the above scenario, the device 104A will have the worst timing margin of all of the devices 104 since the device 104A will be the last device to receive the reflected wavefront for RQ and will be the first device for which RQ becomes invalid at the end of a given cycle (e.g., a given bit of RQ). In other words, the RQ signal may not be valid at device 104A until the wavefront of the RQ signal travels to the end of the path 110 (at device 104N) and the wavefront of the corresponding reflection (resulting from the discontinuity at the end of the path 110) travels back to the device 104A. Moreover, since the initial wavefronts of RQ reach the device 104A before they reach the other devices 104, the wavefront of the subsequent bit (e.g., symbol, etc.) on RQ will reach the device 104A first. As a result, the previous RQ bit on the signaling path 110 will be invalid at device 104A before it is invalid at any other device 104.

The above timing relationships are depicted in FIG. 2. For illustration purposes it is initially assumed that the timing of CK and RQ as shown in FIG. 2 represent the timing of those signals at the outputs of the memory controller 102. In practice, however, for reasons that will be discussed below, these signals may be skewed in time relative to one another when they are output by the memory controller 102.

A waveform RQ0 represents the timing of the signal RQ at the first device 104A. Due to the propagation time over the signal path 110, the initial wavefront of RQ does not reach device 104A until after a period of time corresponding to the delay A. At this point, however, the wavefront may not be at a valid amplitude level as discussed above. Hence, a shaded portion 204 represents the period of time the RQ signal at device 104A may not be valid. In FIGS. 1 and 2, the term BN represents the time period B (discussed above) multiplied by N (the number of memory devices minus one). Thus, the amount of time that elapses from the point in time the initial wavefront of RQ reaches the device 104A to the point in time the reflection wavefront of RQ reaches the device 104A is equal to 2BN as shown in FIG. 2.

In contrast, RQ is valid at the device 104D (DRAM-N) after a time period A+BN. This relationship is shown in FIG. 2 by a timing waveform RQN that represents the signal RQ at device 104D. Here, since the device 104D is at the end of the path 110, the reflection wavefront for RQ occurs substantially simultaneously with the arrival of the initial RQ wavefront. Hence, there is no invalid period for RQN that corresponds to the invalid period 204 for RQ0. It should be appreciated that the times at which RQ becomes valid at any devices 104 located between the devices 104A and 104D will fall between A+BN and A+2BN. Hence, these other devices 104 will have invalid periods similar to, but shorter than, the invalid period 204.

As mentioned above, the RQ signal becomes invalid at device 104A before it becomes invalid at any other device 104. This timing relationship is illustrated in FIG. 2 for RQ0 and RQN. Here, due to the propagation delay over the path 110 between the controller 102 and the device 104A, the next RQ bit will be received at device 104A after a period of time A following the time represented by line 202B. In contrast, due to the longer path distance between the controller 102 and the device 104D, the next RQ bit will be received at the device 104D after a period of time A+BN following the time represented by line 202B.

Clock timing for the system may be optimized based on the above timing relationships. For example, in some cases CK is delayed so that its initial wavefront reaches the first DRAM (device 104A) at substantially the same time as the initial wavefront of the RQ signal reaches the last DRAM (device 104D).

The optimum sampling time for RQ at device 104A (the worst case DRAM) may then be determined based on the times the RQ signal becomes valid and invalid at the device 104A. For example, in some implementations this sampling point may be placed in the center of the time period during which RQ is valid at the device 104A. In this case, the sampling point (i.e., the rising edge of CK) corresponds to a delay of A+BN+(CK_PERIOD/2) from the line 202A. In FIG. 2, a waveform CK0 represents the timing of the clock signal CK at the device 104A. Here, CK0 is shown as being delayed from the line 202A by an amount of time A+BN. The RQ signal (e.g., as represented by RQ0) may thus be sampled at the rising edge of CK (e.g., as represented by CK0) as indicated by a vertical dashed line 206.

To provide this timing, the clock signal CK may be delayed by a time period BN in addition to the delay A that may otherwise be normally associated with the first segment of the path 110 (i.e., the segment between the memory controller 102 and the device 104A). A waveform CKN in FIG. 2 also shows the resulting timing for the clock signal CK at device 104D. Here, CK will be delayed by an amount of time equal to A+2BN+(CK_PERIOD/2) as a result of the delays in the system 100 shown in FIG. 1.

An appropriate delay for a signal path may be provided in various ways. For example, in some implementations the memory controller 102 may include a skew controller 116 that may retard or advance the relative timing of the CK and RQ signals. Thus, in the above example, the skew controller 116 may impart a delay of BN on the CK signal, while the first segment of the path 106 (i.e., between the memory controller 102 and the device 104A) imparts a delay of A. In some implementations the signaling paths may be designed in a manner that provides a desired propagation delay. For example, rather than using the skew controller 116, the first segment of the path 106 may be configured to impart a delay of A+BN on the CK signal. Here, the length or some other physical characteristic of the path conductor material or surrounding material (e.g., insulating material) may be selected to provide the desired signal delay. In some implementations a combination of signal path design and active skew control may be employed to provide a desired delay.

Figure 3:
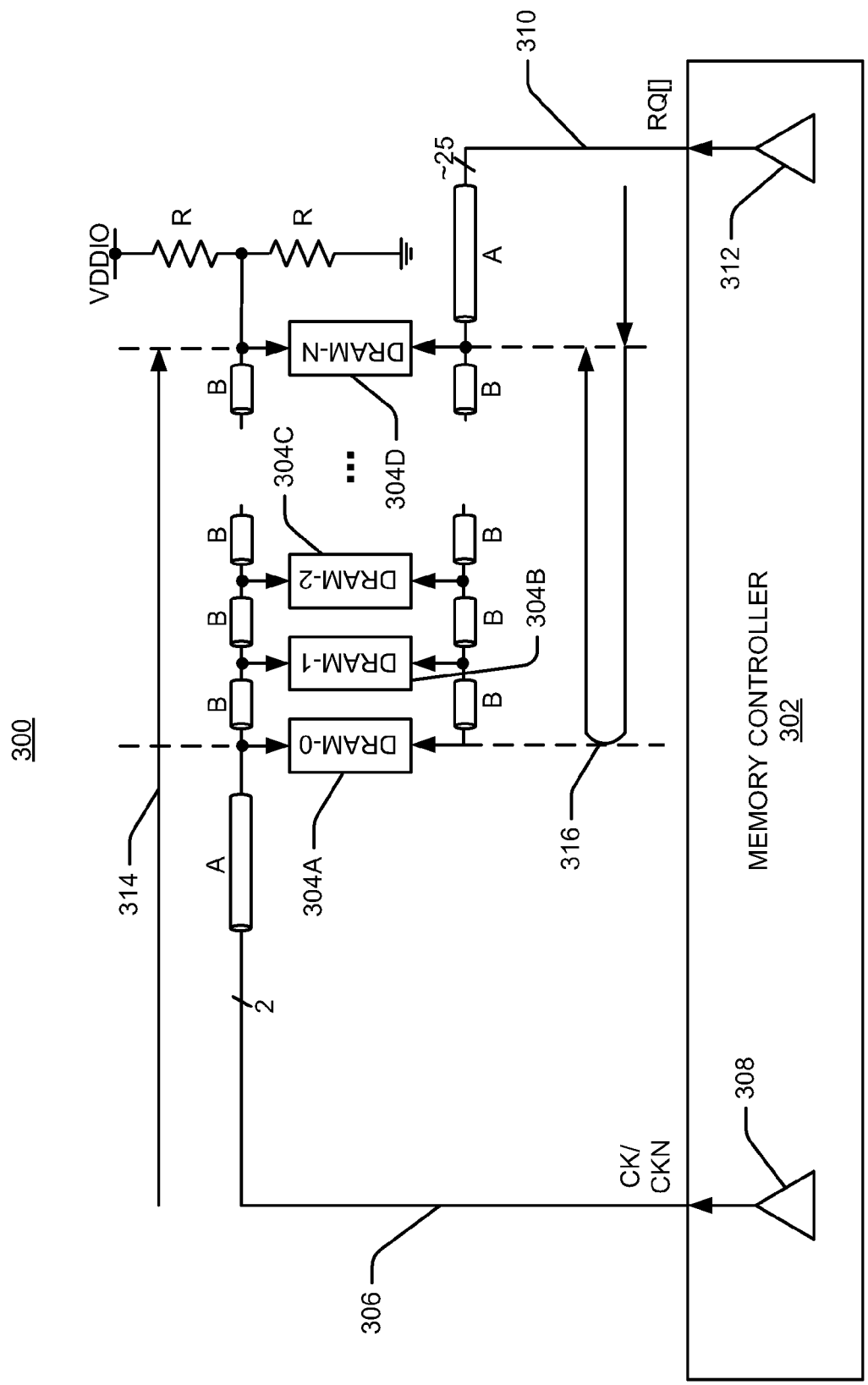
FIG. 3 is a simplified diagram of an embodiment of a memory system employing an opposing fly-by signal routing topology.

Referring now to FIG. 3, a topology scheme is described that may be employed to improve timing margin in a system. Such a scheme may be employed, for example, in a system that provides associated parallel terminated signals and series terminated signals.

In FIG. 3, a memory system 300 includes a memory controller 302 and memory devices 304 (e.g., memory device 304A, etc). As in the example of FIG. 1, a parallel terminated signaling path 306 may carry a timing reference signal (e.g., a complementary clock CK/CKN) from the memory controller 302 to the devices 304. Also as in FIG. 1, the resistors R may be equal in value (e.g., 150 ohms) and a driver 308 that drives the path 306 may have a relatively low output impedance (e.g., 18 ohms).

A series terminated signaling path 310 carries information signals (e.g., a set of signals RQ[ ]) from the memory controller 302 to the devices 304. Also as in FIG. 1, a series source impedance may be provided in or following a driver 312 that drives the path 310 whereby the source impedance may substantially match the nominal impedance of the path 310 (e.g., 50 ohms).

In the example of FIG. 3, however, the signaling paths 306 and 310 are configured so that the initial wavefronts of CK and RQ signals generated by the drivers 308 and 312, respectively, travel in opposite directions with respect to the order of the devices 304 along those paths. For example, the initial wavefront of a CK signal initially travels to the first (e.g., closest) device along the path 206 (i.e., the device 304A), subsequently travels to the device 304B, then travels to the device 304C, and eventually travels to the last (e.g., furthest) device along the path 206 (i.e., the device 304D). Conversely, the initial wavefront of an RQ signal initially travels to the first device 304N along the path 310 (i.e., the last device on path 306), eventually travels to the device 304C, then travels to the device 304B, and then to the last device 304A along the path 310 (i.e., the first device on path 306). It should be appreciated that the term opposite direction as used herein may generally refer to the order in which a wavefront reaches each device of a set of devices. Thus, the term opposite direction may refer to signal that may or may not be traveling in a direction that is at a 180 degree angle with respect to the direction of travel of another signal.

In the topology of FIG. 3, the wavefront of the CK signal and the reflection wavefront of the RQ signal travel in the same direction (relative to the ordering of the devices 304). This timing relationship is illustrated in FIG. 3 where a line 314 shows a direction of propagation of the CK signal and a line 316 shows directions of propagation of the initial RQ wavefront (bottom portion of the line 316) and the RQ reflection wavefront (top portion of the line 316). As will be illustrated by the timing diagram of FIG. 4, the topology scheme of FIG. 3 may advantageously provide improved timing margin.

Figure 4:
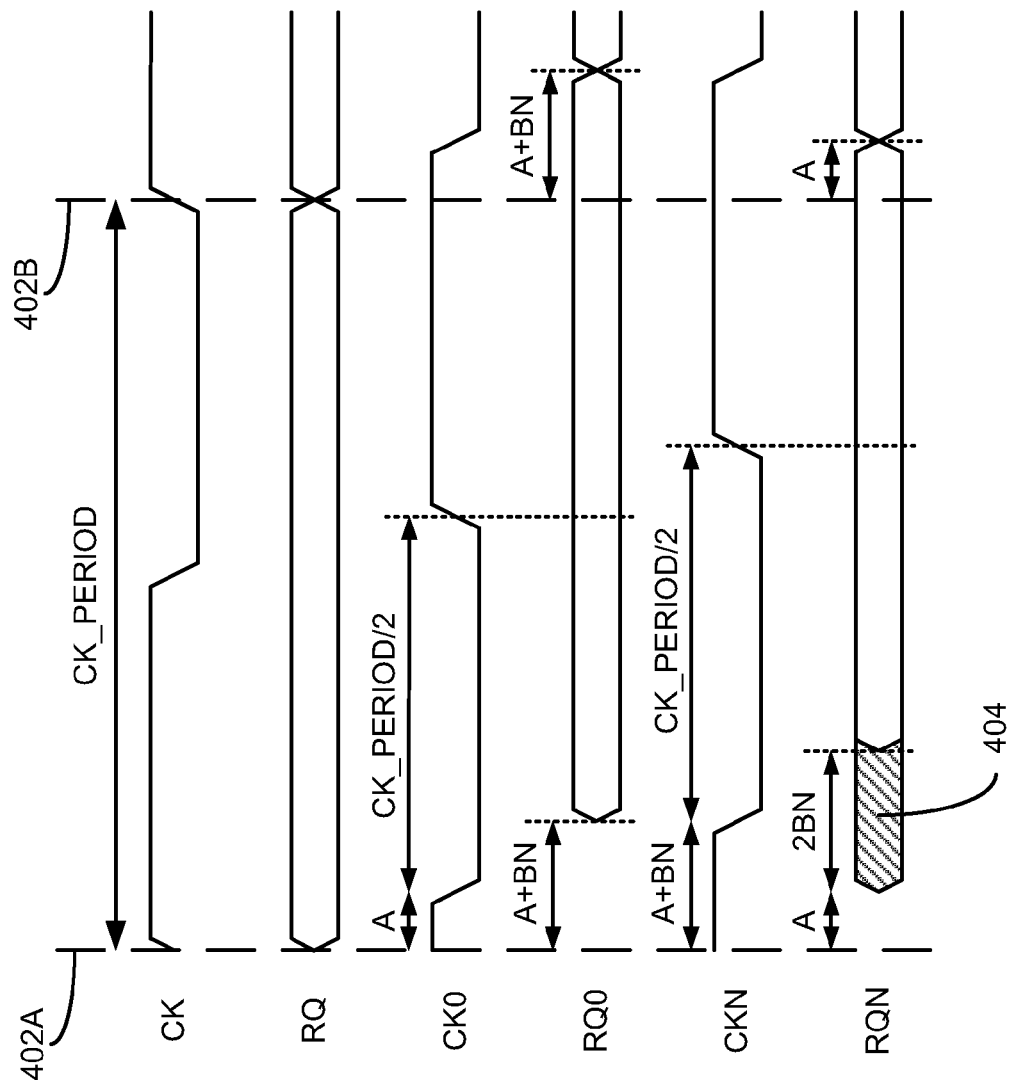
FIG. 4 is a simplified diagram of sample signal timing that may be employed in the memory system of FIG. 3.

The timing diagram of FIG. 4 depicts similar signals as were depicted in FIG. 2. Thus, CK and RQ represent a timing reference signal and an information signal at the memory controller 302. The CK0 and RQ0 waveforms represent the CK and RQ signals, respectively, at DRAM-0 (device 304A). The CKN and RQN waveforms represent the CK and RQ signals, respectively, at DRAM-N (device 304D). Lines 402A and 402B represented points in time at the beginning and end, respectively, of the clock cycle for CK.

In some aspects, clock timing for the system 300 may be optimized by matching the time it takes CK to reach its first DRAM (e.g., device 304A) with the time it takes RQ to reach its first DRAM (e.g., device 304D). Accordingly, in FIG. 3, a delay A is shown in each of the signaling paths 306 and 310.

Referring to the CK0 waveform of FIG. 4, the CK signal thus reaches the device 304A after a delay A from the line 402A. Conversely, as indicated by the RQ0 waveform, the RQ signal reaches the device 304A after a delay A+BN, where A and BN are defined in a similar manner as described above. Since the device 304A is at the end of the path 310, the RQ signal is valid at the device 304A once the initial RQ wavefront arrives and is immediately reflected (e.g., similar to device 104D in FIG. 1).

Referring now to the device 304D, as indicated by the waveform CKN, the CK signal reaches the device 304D after a time period A+BN. However, the initial wavefront of RQ that reaches the device 304D after delay A is not valid (e.g., the magnitude of RQ is VDDIO/2). Instead, the device 304D does not receive a valid RQ signal until the reflection wavefront arrives after an additional delay of 2BN. As in FIG. 1, this time period of an invalid RQ signal is represented by a shaded portion 404 in the waveform RQN.

As compared to FIG. 1, it may be observed that the invalid periods may be similar for RQN of FIG. 4 and RQ0 of FIG. 1. In FIG. 3, however, a delay of BN is imparted on CK due to the topology. Hence, a delay of BN need not be imparted on the CK signal through the use of a skew controller or some other active technique. Consequently, in the example of FIG. 3, the only delay imparted on the CK signal by the memory controller 302 is the CK_PERIOD/2 delay. Advantageously, the memory controller 302 may provide this amount of delay in a relatively efficient and accurate manner (e.g., by simply inverting the CK signal). In contrast, the delay provided by the skew controller 116 of FIG. 1 may be subject to variations due to drift or other conditions. As a result, the timing of the system 300 may be more precise than the timing of the system 100 because the system timing budget does not need to be reduced to compensate for skew controller-related drift, etc.

FIG. 4 also illustrates that with the topology of FIG. 3, a more consistent timing relationship may exist between CK and RQ at each device 304. In this case, the sampling time (e.g., the rising edge of CK) at each device 304 is defined by A+Bn+CK_PERIOD/2 (where n is the DRAM number). Thus, as the RQ valid time (e.g., time A+BN for device 304A) incrementally shifts to the right by a delay period B for each subsequent device 304, CK shifts to the right by an equal amount. Hence, as illustrated by the RQ0 and RQN waveforms, similar setup timing margins may be provided at the devices 304A and 304D for sampling RQ.

In contrast, in FIG. 2 selection of an optimum sample time for the most disadvantaged device (device 104A) may result in a less than optimum sampling point for the other devices. For example, as shown in FIG. 2 different setup timing margins are provided at the devices 104A and 104D for sampling RQ.

In the examples of FIGS. 1 and 3, the memory controller is coupled to several DRAM memory devices. It should be appreciated, however, that the teachings herein may be employed in conjunction with other types of memory devices, memory modules, or other suitable memory components.

Figure 5:
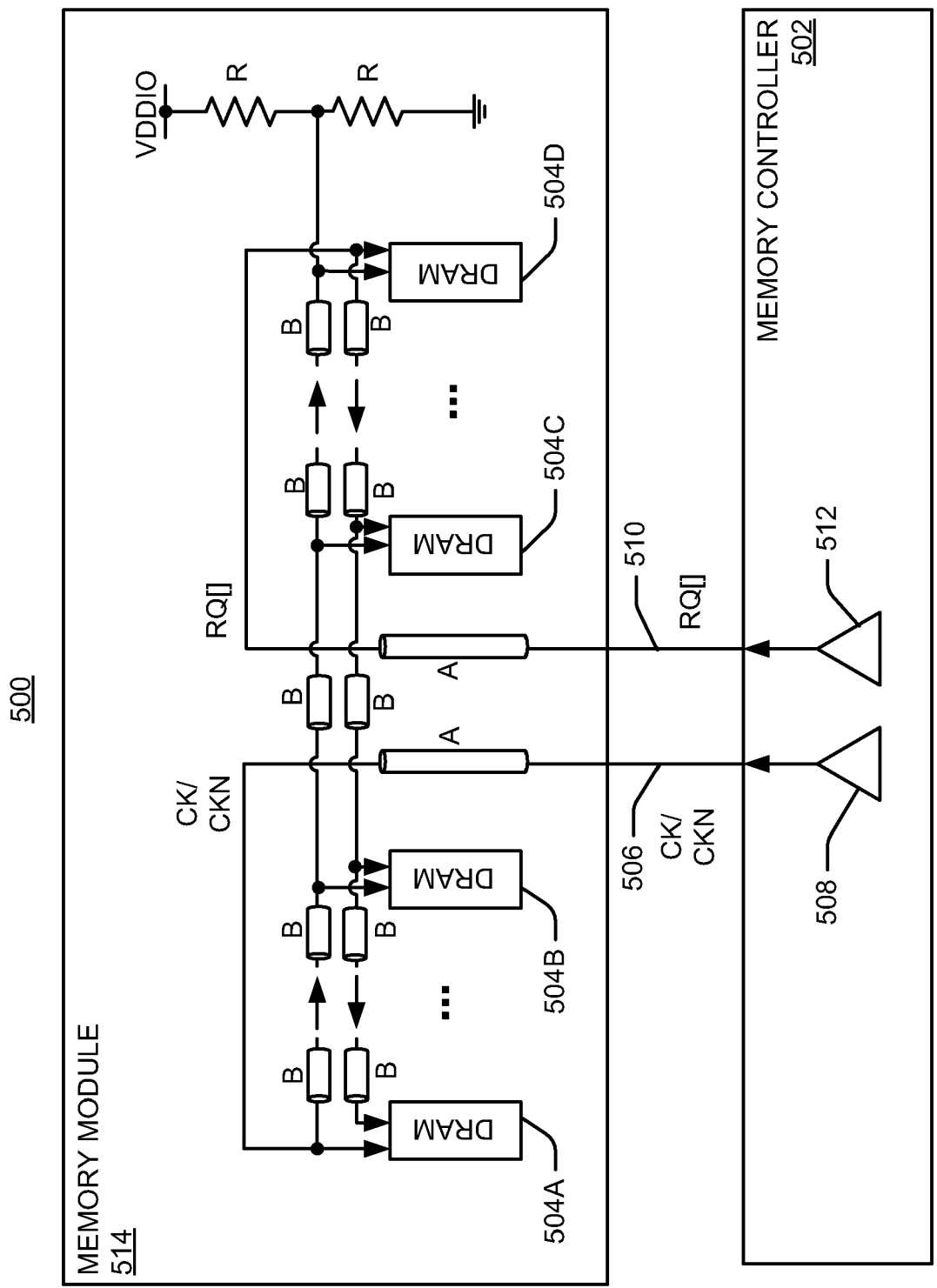
FIG. 5 is a simplified diagram of an embodiment of a memory system including a memory module that employs an opposing fly-by signal routing topology.

FIG. 5 illustrates an example of a memory system 500 where a routing topology as described above is employed, at least in part, in a memory module 514. To reduce the complexity of FIG. 5, only one memory module 514 is shown. It should be appreciated, however, that in some implementations a memory system may employ several memory modules.

From a circuit interconnect perspective, the system 500 is similar to the system 300. For example, a memory controller 502 includes drivers 508 and 512 that drive signaling paths 506 and 510, respectively, coupled to memory devices 504 (e.g., device 504A, etc.). In addition, the signaling path 506 includes parallel termination at resistors R (e.g., 150 ohms) and the signaling path 510 includes series termination (e.g., 50 ohms) at its source.

In FIG. 5, however, the memory devices 504, portions of the signaling paths 506 and 510, and the parallel termination resistors R are incorporated into the memory module 514. In a similar manner as discussed above, the signaling paths 506 and 510 are configured so that the initial wavefronts of a CK signal and an RQ signal travel in opposite directions with respect to the ordering of the memory devices 504.

FIG. 5 also illustrates an example of how signaling paths may be advantageously routed as a bundle from a memory controller to a memory module or, in implementations that do not use memory modules, from a memory controller to a set of memory devices. In FIG. 5, the signaling paths 506 and 510 are routed together (e.g., in parallel) from the memory controller 502 to a center (or approximate center) area of the set of memory device 504. The signaling paths 506 and 510 are then routed in opposite directions toward respective end areas of the set of memory devices 504. Finally, the signaling paths 506 and 510 are routed in a fly-by manner to each of the memory devices 504, whereby the different signaling paths 506 and 510 are connected in opposite order to the memory devices 504. Through the use of the routing topology of FIG. 5, delays (e.g., delays A) associated with the signaling paths 506 and 510 may be more easily matched since the signaling paths 506 and 510 may be made substantially symmetrical. Consequently, the system 500 may achieve additional improvements in system timing margin due to the improved matching of the paths for CK and RQ.

It should be appreciated that the teachings herein may be employed in various topologies. For example, the termination and fly-by schemes described above may be employed in conjunction with a mesh topology. One example of such a mesh topology is a matched tree topology that provides substantially identical signaling paths to each memory device via the branches of the tree in an attempt to maintain substantially identical signal timing at every memory device. Many variations of such schemes are also possible. For example, FIG. 6 illustrates an example of a memory system 600 employing a hybrid-T topology that has a multi-branch timing reference signal path and a fly-by signal path for information signals.

From a general circuit interconnect perspective, the system 600 is similar to the system 300 of FIG. 3. For example, a memory controller 602 includes drivers 608 and 612 that drive signaling paths 606 and 610, respectively, coupled to memory devices (e.g., device 604A). The signaling path 606 includes parallel termination resistors R (e.g., 150 ohms) and the signaling path 610 includes series termination (e.g., 50 ohms). In this case, however, the signaling path 606 is split into multiple branches, where one branch connects to one set of memory devices (e.g., devices 604A-604C) and another branch connects to another set of memory devices (e.g., including device 604D). Accordingly, in this case, the impedances of the path 606 including its branches may be defined to provide acceptable signals levels on each of the branches.

Due to the split in the signaling path 606, the initial wavefront of a CK signal travels in one direction for one set of memory devices (e.g., devices 604A-604C) and travels in another direction for another set of memory devices (e.g., including device 604D). Thus, in this case, for one branch of the path 606 (e.g., coupled to devices 604A-604C) the initial wavefront of CK and the initial wavefront of RQ on the path 610 travel in opposite directions. In addition, for another branch of the path 606 (e.g., coupled to device 604D) the initial wavefront of CK travels in the same direction as the initial wavefront of RQ on the path 610.

Figure 6:
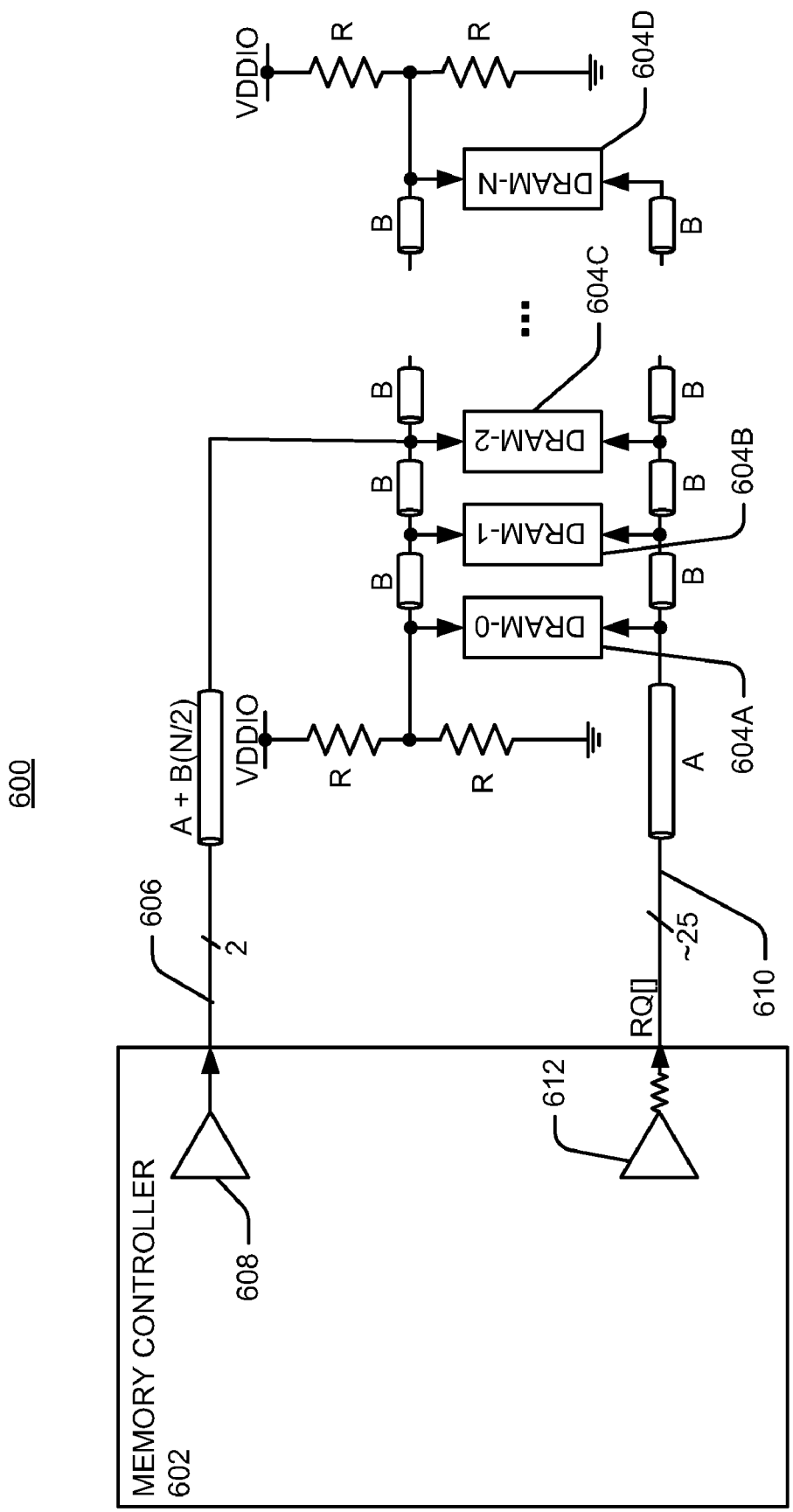
FIG. 6 is a simplified diagram of an embodiment of a memory system employing a hybrid-T signal routing topology.

The topology of FIG. 6 may be used to provide improved timing margin since the CK signal will not be subject to as much delay (e.g., the B delays) before reaching the final memory device 604 of a given branch. However, since the braches are in parallel, the system 600 may consume more power than the previous examples. For example, if the same number of memory devices 604 are in each branch and the same termination resistors are used in each branch, the power consumption associated with parallel termination may be twice the power consumption of a system that uses the topology of FIG. 3.

In a similar manner as in FIG. 1, an additional delay may be provided on the signaling path 606 to provide optimum system timing margin. In general, the amount of this delay is depends on the particular configuration of the system. In the example of FIG. 6, a delay of B(N/2) may be added to the path 606 (e.g., in addition to an inherent delay A) for the case where the branches have the same number of memory devices 604. As discussed above, this delay may be imparted through the use of a skew controller (not shown in FIG. 6) and/or by appropriate design of the path 606.

Figure 7:
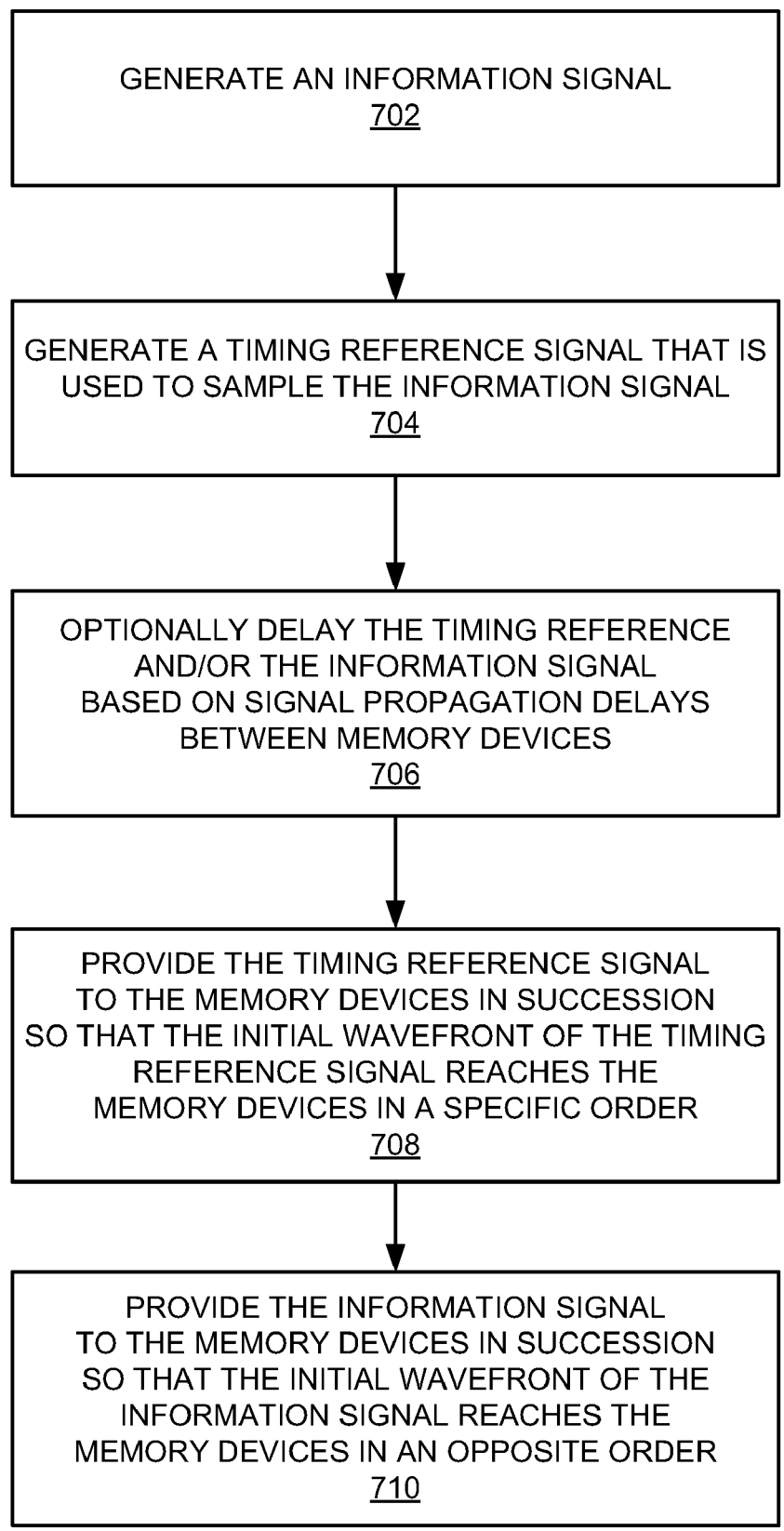
FIG. 7 is a flow chart of an embodiment of memory system operations that may be performed in accordance with the teachings herein.

In some aspects, the functionality of the systems described herein may be described in terms of a series of operations. To further illustrate this point, the flowchart of FIG. 7 depicts several of these operations. Briefly, as represented by blocks 702 and 704 a signal generating device (e.g., a memory controller) comprising signal drivers generates a timing reference signal and an information signal, where the timing reference signal comprises a sampling reference for the information signal. As represented by block 706, one or both of the timing reference signal and the information signal may optionally be delayed (e.g., as discussed above) based on signal propagation delay times between devices (e.g., memory devices) that sample the information signal. As represented by block 708, the timing reference signal is provided to the devices in succession so that the initial wavefront of the timing reference signal reaches the devices in a specific order (e.g., initially to the first device, then to successive devices, then to the last device). As represented by block 710, the information signal is provided to the devices in succession so that the initial wavefront of the information signal reaches the devices in an order that is opposite the specific order of block 708. For example, the information signal wavefront initially travels to the "last" device (as specified at block 708), then to successive devices, then to the "first" device.

Figure 8:
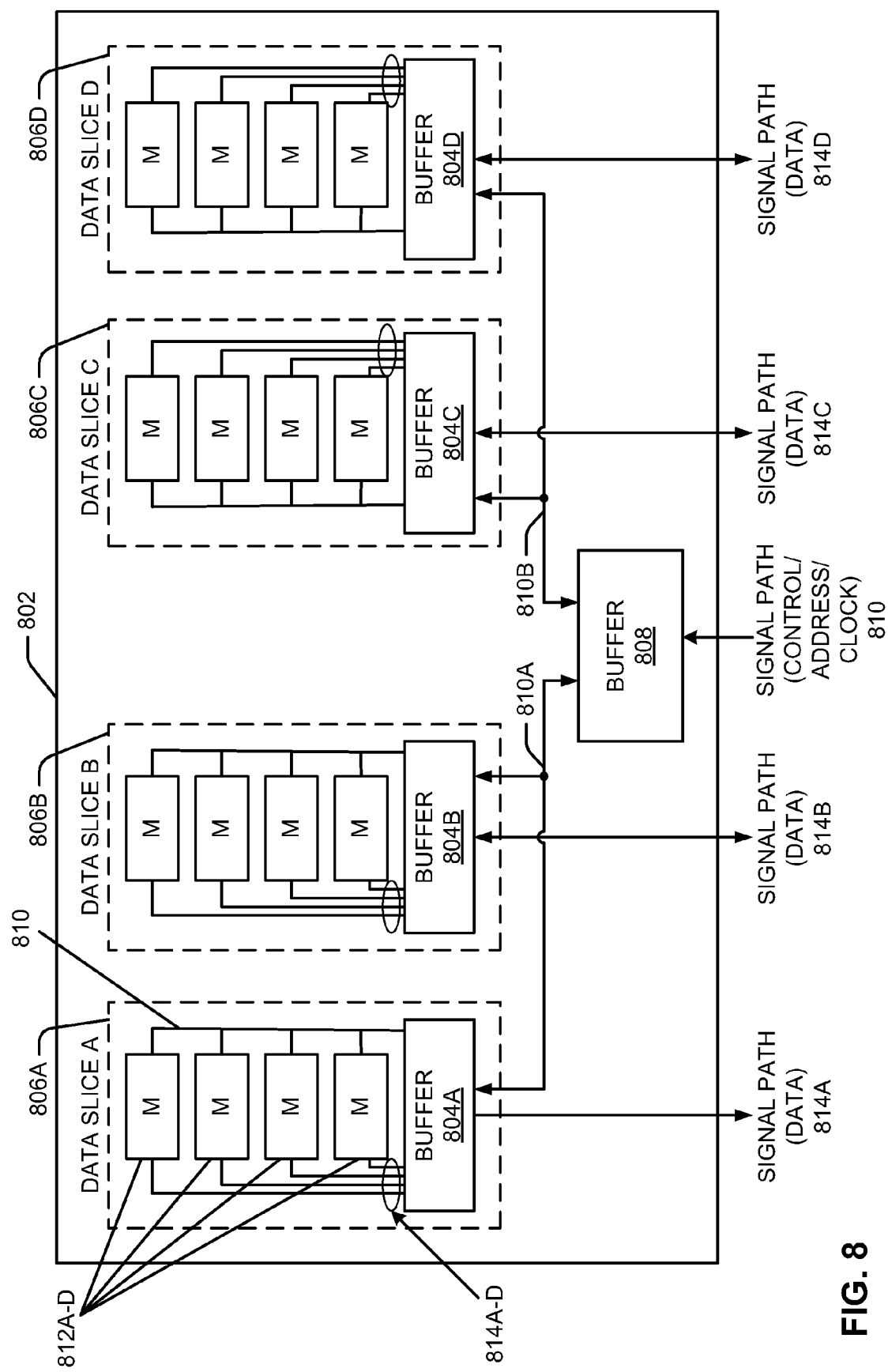
FIG. 8 is a simplified block diagram of an embodiment of a memory module comprising at least one memory buffer.

As mentioned above, in some embodiments the memory devices may be incorporated into a memory module. FIG. 8 illustrates an embodiment of a memory module 802 that also incorporates a series of memory buffer devices 804A-804D, each of which may buffer signals and provide other functionality for one or more slices (subsets) 806A-806D of a data bus. Here, each data slice 806A-806D includes a set of memory devices M (e.g., devices 812A-812D) that in some embodiments may be implemented as separate integrated circuit dies (e.g., in separate packages or within a common package).

In some aspects a buffer device is an integrated circuit that acts as an interface between a memory module connector interface and at least one integrated circuit memory device. The buffer devices 804A-804D may be configured to perform one or more of isolating, storing, routing, or translating signals for the memory devices M in each of the data slices 806A-806D. Such signals may comprise, for example, signal paths 814A-814D for a data bus and signal paths 810 for control, address, and clock signals. Through the use of these buffers, signals of sufficient quality and having desired timing characteristics may be more effectively provided for and received from each of the memory devices M (e.g., devices 812A-812D) of each of the data slices 806A-806D.

In some aspects the routing topology and signal delay features described above may be implemented in a buffer. For example, signaling paths may be routed in an opposing manner to the memory device M through one or more buffers in the manner of FIG. 3. As a specific example, the data signal paths 814A-814D may be series terminated at the source (e.g., at a memory controller, not shown in FIG. 8) and timing signals (e.g., clock, data strobe, etc.) of path 810 may be parallel terminated at each data slice. The paths 814A-814D may thus comprise a fly-by signal path that is connected to the memory devices M in the opposite order with respect to the connections of the path 810 associated with the timing signals. In addition, a buffer (e.g., buffer 808) may provide the BN delay of FIG. 1 or some other suitable skew control function.

As an alternative example, the buffers may regenerate the signals on the paths 810 and 814. For example, the buffers may terminate inbound timing signals (e.g., clock, data strobe, etc.) of path 810 and provide the series termination for outbound data signal paths 814A-814D. Regenerated timing signals of path 810 may be parallel terminated at each data slice and regenerated data signals (corresponding to paths 814A-814D) may be provided via a fly-by signal path that is connected to the memory devices M in the opposite order as the regenerated timing signals of path 810. Again, one or more the buffers (e.g., buffer 808) may provide additional delay or skew control.

In some embodiments a buffer device 808 may be used to provide address, control and clock signals for the memory module 802. The buffer device 808 may be a clocked buffer device that adjusts a temporal relationship for control and address information provided via signal paths 810A and 810B. In some embodiments the buffer device 808 receives control information that specifies an access to the at least one of the memory devices M, whereby the buffer device 808 outputs an appropriate control signal to the specified memory device.

In practice, appropriate termination may be associated with each of the signal paths of the memory module 802. In particular, such terminations may be matched to each corresponding leg of the signal paths.

In the example of FIG. 8, control, address, and clock signals are provided to the memory devices M in a split multi-drop topology and different sets of the data signals are provided separately to each of the memory devices M. It should be appreciated, however, that the buffers 804A-804D may be utilized with other bus architectures.

The memory buffers and the memory devices may be implemented in various ways. For example, in some embodiments each of the memory buffers 804A-804D and 808 and each of the memory devices M may be implemented as separate integrated circuit devices. In other embodiments the functionality of the memory buffers 804A-804D and 808 may be combined into a single integrated circuit. Such memory buffers also may include appropriate signal ports and signal interfaces (e.g., signal receivers and signal drivers) for interfacing with one or more memory devices and/or one or more memory module connectors (e.g. that provides connectivity to a memory controller).

In some embodiments the memory buffer(s) and the memory device(s) may be implemented on separate integrated circuit dies. Here, an integrated circuit memory device may be distinguished from the memory die in that a memory die may be a monolithic integrated circuit formed from semiconductor materials for storing and/or retrieving data or other memory functions, whereas an integrated circuit memory device may be a memory die having at least some form of packaging. Similarly, an integrated circuit buffer device may be distinguished from a buffer die in that a buffer die may be a monolithic integrated circuit formed from semiconductor materials that performs at least one memory buffer function as taught herein, wherein an integrated circuit buffer device may be buffer die having at least some form of packaging.

In some aspects, a memory device may comprise a semiconductor integrated circuit device that includes a set of storage cells, which may collectively provide a memory array or a portion of a memory array. Examples of such memory devices include volatile memory devices, nonvolatile memory devices, DRAMs, SRAMs, and flash memory devices.

A memory system as taught herein may be used in a variety of applications. For example, such a memory system may be incorporated into a computer graphics card, a videogame console, a printer, a personal computer, a server, or some other apparatus that utilizes data storage.

It should be appreciated that various modifications may be made to the disclosed embodiments or other embodiments implemented according to the teachings herein. For example, the teachings herein may be applicable to synchronous or asynchronous memory systems and to point-to-point topologies or other topologies. In addition, a memory system also may include functionality as disclosed herein yet be implemented using components other than a memory controller or memory modules.

A signaling path as taught herein may be implemented in various ways. For example, the manner which a given signaling path is routed from component to component may differ in different embodiments. Also, different physical structures may be employed to provide a signaling path. For example, in some embodiments the signaling paths described herein may comprise traces of a printed circuit board (not shown) upon which a memory controller and memory devices or modules are mounted. In some embodiments the signaling paths may be implemented using one or more cables or other similar interconnect devices. Other embodiments may employ other means for providing these signaling paths.

It also should be appreciated that the various structures and functions described herein may be implemented in various ways and using a variety of apparatuses. For example, a device may be implemented by various hardware components such a processor, a controller, a state machine, logic, or some combination of one or more of these components.

In some embodiments, code including instructions (e.g., software, firmware, middleware, etc.) may be executed on one or more processing devices to implement one or more of the described functions or components. The code and associated components (e.g., data structures and other components by the code or to execute the code) may be stored in an appropriate memory device (e.g., commonly referred to as a computer-readable medium) that is readable by a processing device.

In general, the recited order of the blocks in any processes disclosed herein is simply an example of a suitable approach. Thus, operations associated with such blocks may be rearranged while remaining within the scope of the present disclosure. Similarly, any accompanying method claims present operations in a sample order, and are not necessarily limited to the specific order presented.

The components and functions described herein may be connected or coupled in various ways. The manner in which this is done may depend, in part, on whether and how the components are separated from the other components. In some embodiments some of the connections or couplings represented by the lead lines in the drawings may be in an integrated circuit, on a circuit board or implemented as discrete wires, or in some other way.

The signals discussed herein may take various forms. For example, in some embodiments a signal may comprise electrical signals transmitted over a wire, light pulses transmitted through an optical medium such as an optical fiber or air, or RF waves transmitted through a medium such as air, etc. In addition, a plurality of signals may be collectively referred to as a signal herein. The signals discussed above also may take the form of data. For example, in some embodiments an application program may send a signal to another application program. Such a signal may be stored in a data memory.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

While certain sample embodiments have been described above in detail and shown in the accompanying drawings, it is to be understood that such embodiments are merely illustrative of and not restrictive of the teachings herein. In particular, it should be recognized that the teachings herein may apply to a wide variety of apparatuses and methods. It will thus be recognized that various modifications may be made to the illustrated and other embodiments as taught herein, without departing from the scope thereof. In view of the above it will be understood that the teachings herein are not limited to the particular embodiments or arrangements disclosed, but are rather intended to cover any changes, adaptations or modifications which are within the scope of the appended claims.

What is claimed is:

1. A method of operating a memory system, comprising:
providing a timing reference signal to memory devices such that an initial wavefront of the timing reference signal successively reaches each of the memory devices in a first order; and
providing an information signal to the memory devices such that an initial wavefront of the information signal successively reaches each of the memory devices in a second order, the second order being opposite that of the first order such that a reflection of the information signal successively reaches each of the memory devices in the first order, wherein the timing reference signal comprises a reference for sampling the reflection of the information signal.

2. The method of claim 1, wherein:
the first order involves the initial wavefront of the timing reference signal initially reaching a first one of the memory devices, then successively reaching subsequent ones of the memory devices until a last one of the memory devices is reached; and
the second order involves the initial wavefront of the information signal initially reaching the last one of the memory devices, then successively reaching the subsequent ones of the memory devices until the first one of the memory devices is reached.

3. The method of claim 1, wherein:
the timing reference signal is provided via a first signal path configured to couple a first signal driver to the memory devices, wherein a first one of the memory devices is closest to the first signal driver along the first signal path and a last one of the memory devices is furthest from the first signal driver along the first signal path; and
the information signal is provided via a second signal path configured to couple a second signal driver to the memory devices, wherein the last one of the memory devices is closest to the second signal driver along the second signal path and the first one of the memory devices is furthest from the second signal driver along the second signal path.

4. The method of claim 3, wherein:
the first signal path is parallel terminated; and
the second signal path is series terminated.

5. The method of claim 4, wherein:
the parallel termination is provided on the first signal path at or after the last one of the memory devices; and
the series termination of the second signal path comprises source termination.

6. The method of claim 1, wherein:
the timing reference signal comprises a clock signal or a data strobe signal; and
the information signal comprises a command and address bus signal or a data signal.

7. The method of claim 1, wherein the timing reference signal and the information signal are provided by a memory controller.

8. The method of claim 1, wherein:
the memory devices are incorporated into at least one memory module; and
the at least one memory module comprises signal paths configured to couple connectors to the memory devices to provide the timing reference signal and the information signal to the memory devices in succession in opposite directions.

9. A system, comprising:
a first signal driver for providing a timing reference signal;
a second signal driver for providing an information signal, wherein the timing reference signal comprises a reference for sampling a reflection of the information signal;
a plurality of signal sampling devices;
a first signal path configured to couple the first signal driver to the signal sampling devices, wherein a first one of the signal sampling devices is closest to the first signal driver along the first signal path and a last one of the signal sampling devices is furthest from the first signal driver along the first signal path; and
a second signal path configured to couple the second signal driver to the signal sampling devices, wherein the last one of the signal sampling devices is closest to the second signal driver along the second signal path and the first one of the signal sampling devices is furthest from the second signal driver along the second signal path.

10. The system of claim 9, wherein:
the first signal driver and the second signal driver are incorporated into a memory controller; and
the signal sampling devices comprise memory devices.

11. The system of claim 10, wherein the memory devices are incorporated into at least one memory module.

12. The system of claim 11, wherein:
the at least one memory module comprises at least one memory buffer; and
at least a portion of the first and second signal paths are incorporated into the at least one memory buffer.

13. The system of claim 10, further comprising:
parallel termination for the first signal path; and
series termination for the second signal path.

14. The system of claim 13, wherein:
the parallel termination is provided on the first signal path at or after the last one of the signal sampling devices; and
the series termination for the second signal path comprises source termination.

15. The system of claim 10, wherein the first and second signal paths are configured such that initial wavefronts of the timing reference signal and the information signal travel in opposite directions and the initial wavefront of the timing reference signal and the reflection of the information signal travel in a common direction.

16. The system of claim 10, wherein:
the timing reference signal comprises a clock signal or a data strobe signal; and
the information signal comprises a command and address bus signal or a data signal.

17. The system of claim 10, wherein:
the first signal path is configured to provide a first signal delay between the memory controller and the first one of the signal sampling devices;
the second signal path is configured to provide a second signal delay between the memory controller and the last one of the signal sampling devices; and
the first signal delay and the second signal delay are substantially equal.

18. The system of claim 10, wherein:
the first and second signal paths are routed between first and second subsets of the memory devices;
the first signal path is routed to an end of the first subset of the memory devices;
the second signal path is routed to an end of the second subset of the memory devices; and
the first and second signal paths are coupled to each of the memory devices.

19. A system, comprising:
means for providing a timing reference signal to memory devices such that an initial wavefront of the timing reference signal successively reaches each of the memory devices in a first order; and
means for providing an information signal to the memory devices such that an initial wavefront of the information signal successively reaches each of the memory devices in a second order, the second order being opposite that of the first order such that a reflection of the information signal successively reaches each of the memory devices in the first order, wherein the timing reference signal comprises a reference for sampling the reflection of the information signal.

20. A system, comprising:
means for providing a timing reference signal;
means for providing an information signal, wherein the timing reference signal comprises a reference for sampling a reflection of the information signal;
a plurality of signal sampling means;
a first signal path configured to couple the means for providing a timing reference signal to the plurality of signal sampling means, wherein a first one of the plurality of signal sampling means is closest to the means for providing a timing reference signal along the first signal path and a last one of the plurality of signal sampling means is furthest from the means for providing a timing reference signal along the first signal path; and
a second signal path configured to couple the means for providing an information signal to the plurality of signal sampling means, wherein the last one of the plurality of signal sampling means is closest to the means for providing an information signal along the second signal path and the first one of the plurality of signal sampling means is furthest from the means for providing an information signal along the second signal path.

* * * * *